United States Patent [19]
Kim et al.

[11] Patent Number: 5,909,265
[45] Date of Patent: Jun. 1, 1999

[54] METHOD OF FABRICATING A MULTI-DOMAIN LIQUID CRYSTAL CELL

[75] Inventors: Jong Hyun Kim, Seoul; Yoo Jin Choi, Anyang-shi; Ki Hyuk Yoon, Seoul; Mi Sook Nam, Anyang-shi; Joung Won Woo, Seoul, all of Rep. of Korea

[73] Assignee: LG Electronics Inc., Seoul, Rep. of Korea

[21] Appl. No.: 08/934,768

[22] Filed: Sep. 22, 1997

[30] Foreign Application Priority Data

Sep. 20, 1996 [KR] Rep. of Korea .................. 1996-41342

[51] Int. Cl.$^6$ ................................................ G02F 1/1337
[52] U.S. Cl. .......................... 349/129; 349/124; 349/125
[58] Field of Search .................... 349/129, 124, 349/125

[56] References Cited

U.S. PATENT DOCUMENTS

| | | | |
|---|---|---|---|
| 5,380,459 | 1/1995 | Kanemoto et al. | 252/299.01 |
| 5,464,669 | 11/1995 | Kang et al. | 428/1 |
| 5,576,862 | 11/1996 | Sugiyama et al. | 359/75 |
| 5,623,354 | 4/1997 | Lien et al. | 349/124 |
| 5,626,995 | 5/1997 | Teruya et al. | 349/124 |
| 5,657,102 | 8/1997 | Mizushima et al. | 349/129 |
| 5,657,105 | 8/1997 | McCartney | 349/124 |
| 5,745,206 | 4/1998 | Koike et al. | 349/129 |

FOREIGN PATENT DOCUMENTS

| | | |
|---|---|---|
| 0742471 A2 | 11/1996 | European Pat. Off. . |
| 2309793 | 8/1997 | United Kingdom . |

OTHER PUBLICATIONS

Schadt, M. et al., "Surface–Induced Parallel Alignment of Liquid Crystals by Linearly Polymerized Photopolymers", *Jpn. J. Appl. Phys.*, vol. 31, No. 7, Jul. 1992, pp. 2155–2164.

Hashimoto, TN–LCD with Quartered Subpixels Using Polarized UV–Light–Irradiated Polymer Orientation Films, SID 95 Digest, pp. 877–880.

*Primary Examiner*—William L. Sikes
*Assistant Examiner*—Tarifur R. Chowdhury
*Attorney, Agent, or Firm*—Morgan, Lewis & Bockius LLP

[57] ABSTRACT

A method of fabricating multi-domain liquid crystal cell includes the steps of providing first and second substrates, the first and second substrates being coated with photo-alignment layer, covering the substrate with a mask which has a plurality regions having different transmittances, exposing the substrate to vertical light having a first polarization direction, and exposing the substrate to oblique light. The photo-alignment materials include polysiloxane-based materials.

11 Claims, 4 Drawing Sheets

METHOD OF FABRICATING A MULTI-DOMAIN LIQUID CRYSTAL CELL

This application claims the benefit of Korean patent application No. 1996-41342, filed Sep. 20, 1996, which is hereby incorporated by reference.

BACKGROUND OF THE INVENTION

1. Field of the Invention

The present invention relates to a method of fabricating a multi-domain liquid crystal cell, and, more particularly, to a simplified method of fabricating the wide viewing angle liquid crystal cell.

2. Discussion of Related Art

A twisted nematic liquid crystal display (TN LCD) has a contrast angular problem, i.e., the transmittance in each gray level depends on the viewing angle. This contrast angular dependence is especially strong in the up and down directions, and is caused by the electrically induced liquid crystal (LC) director configuration.

To solve this angular dependence problem, a multi-domain LCD such as a two-domain TN LCD (TDTN LCD) and a domain-divided TN LCD (DDTN LCD) have been introduced. In the TDTN LCD, each pixel has two director configuration domains, where the two pretilted directions are in opposing directions. Applying a gray level voltage to this LCD, the LC directors in two domains are tilted in opposite directions. These configurations average the up and down directions transmittance. In the DDTN LCD, materials having different pretilt angles, such as organic or inorganic materials, are alternately aligned in the each pixel. The aligning process results in each aligned area (i.e., each domain) having a pretilt angle different from that of the neighboring domain.

In the multi-domain liquid crystal cell discussed above, the most useful aligning method is the so-called rubbing method. In the rubbing method, the alignment layer, which consists of polyimide-coated layers, is mechanically rubbed with a rubbing cloth, etc., so that microgrooves are created on the surface of the alignment layer. The periodic topology of mechanically grooved LCD-substrates minimizes the elastic deformation energy of liquid crystals by forcing the director to align parallel to the microgrooves. In the rubbing method, however, the defect of the microgrooves causes random phase distortion and light scattering, so that the image quality deteriorates. Further, the rubbing process generates dust and discharge on the alignment layer causing the damage to the substrate and resultant yield deterioration.

A new method called the photo-alignment method was recently introduced in order to overcome the substrate damage problem.

FIGS. 1A–1E are views showing the fabrication method of the dual-domain (or two domain) cell using the photo-alignment process. In the figure, the hatched region of the substrate indicates the region blocked by the opaque mask, and the arrow in the substrate indicates alignment direction. The arrow above the substrate indicates the irradiation direction of the light.

First, the first domain I of the photo alignment material-coated substrate is blocked by the opaque mask. Then the substrate is exposed to vertical linearly polarized light having a first polarization direction, in order to define the first degenerated alignment direction in the second domain II, as shown in FIG. 1A. Subsequently, as shown in FIG. 1B, the substrate is exposed to oblique linearly polarized light having a second polarization direction which is perpendicular to the first polarization direction in order to select one direction of the first degenerated direction. As a result, the first alignment direction is formed in the second domain II.

Thereafter, the first domain I is uncovered, and the second domain II is covered with the mask. The substrate is exposed to vertical linearly polarized light having a third polarization direction perpendicular to the first polarization direction to define the second degenerated alignment direction, as shown in FIG. 1C. At this time, the degenerated second alignment direction is perpendicular to the first alignment direction. Subsequently, the substrate is exposed to oblique light in order to select one degenerated direction, as shown in FIG. 1D. FIG. 1E is a view showing the dual domain cell where the alignment directions of the domains are fully determined, after removing the mask. As shown in FIG. 1E, the alignment directions in the first and second domains are perpendicular to each other.

This process is again carried out for a second substrate, and then the two substrates are combined to form a dual-domain liquid crystal cell.

The alignment process of a multi-domain cell, such as a dual domain cell, however, is complex and costly, since eight exposure processes and four masking processes are needed.

SUMMARY OF THE INVENTION

Accordingly, the present invention is directed to a method of fabricating a liquid crystal cell that substantially obviates one or more of the problems due to the limitations and disadvantages of the related art.

An object of the present invention is to provide a method of fabricating a wide viewing angle liquid crystal cell in which domains of the alignment layer absorb different amount of the energy during single exposure of the alignment layer to define a different alignment direction in each domain.

To achieve these an other advantages, and in accordance with the purpose of the present invention, as embodied and broadly described, the method of fabricating a liquid crystal cell includes the steps of:

(a) dividing a first substrate coated with a photo-alignment material into a plurality of domains;

(b) exposing the first substrate to a vertical light, whereby different domains of the first substrate absorb different amounts of energy; and (c) exposing the first substrate to light at an oblique angle.

In another aspect of the present invention, there is provided a method of fabricating a multi-domain liquid crystal cell including the steps of:

(a) coating a substrate with a photo-alignment material;

(b) covering the substrate with a mask, the mask including a plurality of transparent mask sections, a plurality of partly transparent mask sections, and a plurality of opaque mask sections, the sections corresponding to a plurality of domains on the substrate;

(c) exposing the substrate to vertical light polarized in a first polarization direction so as to define degenerated alignment directions of domains of the substrate corresponding to the plurality of transparent mask section and the plurality of partly transparent mask sections, (d) exposing the substrate to oblique light so as to select one alignment direction of the degenerated alignment directions;

(e) covering the substrate with another mask, such that the domains of the substrate having one alignment direction already selected are covered by opaque sections of the another mask, and remaining domains of the substrate not having one alignment direction already selected are covered either by transparent sections of the another mask or partly transparent sections of the another mask;

(f) exposing the substrate to vertical light polarized in a second polarization direction so as to define different degenerated alignment directions of the remaining domains; and (g) exposing the substrate to oblique light so as to select one alignment direction of the different degenerated alignment directions.

It is to be understood that both the foregoing general description and the following detailed description are exemplary and explanatory and are intended to provide further explanation of the invention as claimed.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
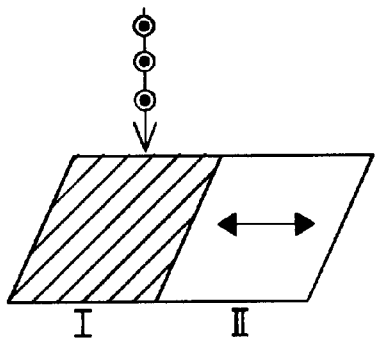
FIGS. 1A–1E are views showing the conventional fabricating method of the dual domain liquid crystal cell.
Figure 1B:
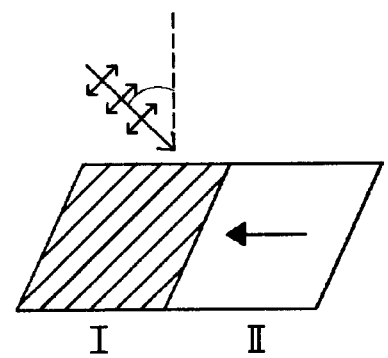
Figure 1C:
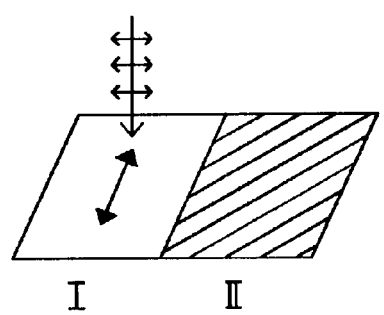
Figure 1D:
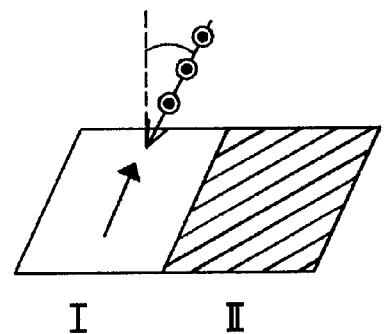
Figure 1E:
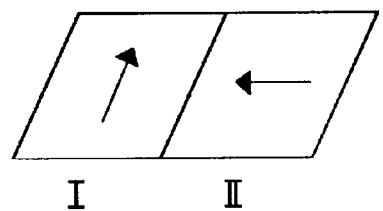
Figure 2:
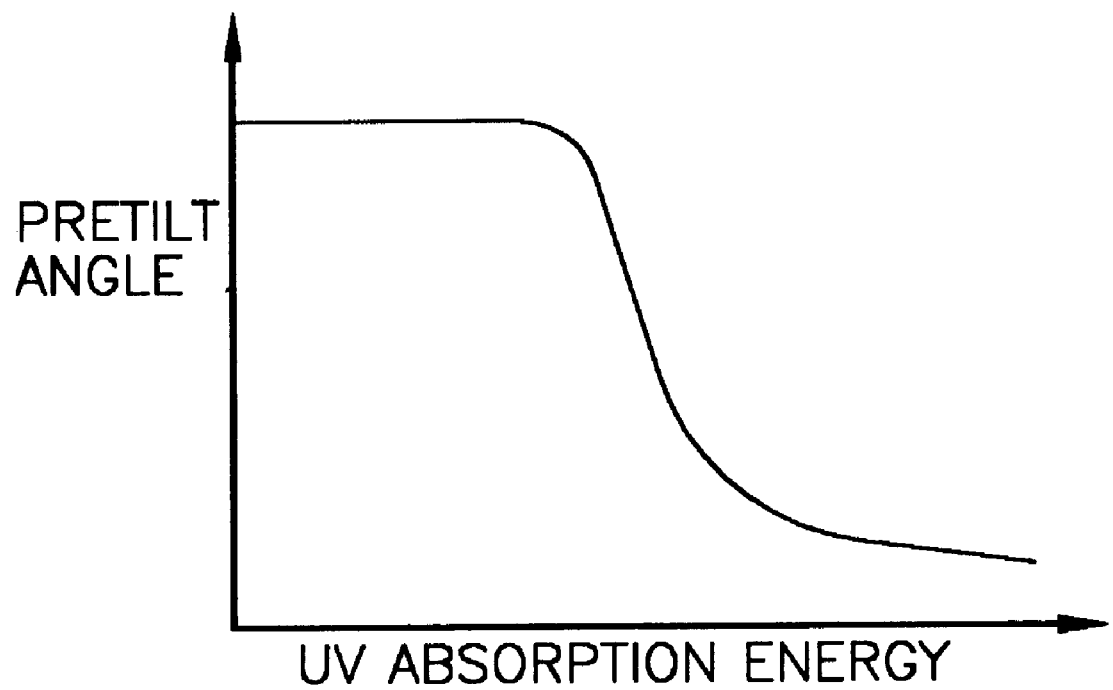
FIG. 2 is a graph showing the relation of the pretilt angle and the absorption energy or the alignment layer according to the present invention.

In the present invention, polysiloxane-based materials are used as an alignment layer, while polyvinylcinnamate is used as a conventional alignment material (see, e.g., the HASHIMOTO method disclosed in SID 95 DIGEST, p. 877). In the HASHIMOTO method, since the pretilt angle produced by the exposure is about 0.1–0.3 degree, which is very small, the desired pretilt cannot be obtained. In the present alignment materials, however, the pretilt angle depends upon the ultraviolet (UV) energy absorbed by the material, as shown in FIG. 2, so that the pretilt angle can be controlled appropriately.

Figure 3A:
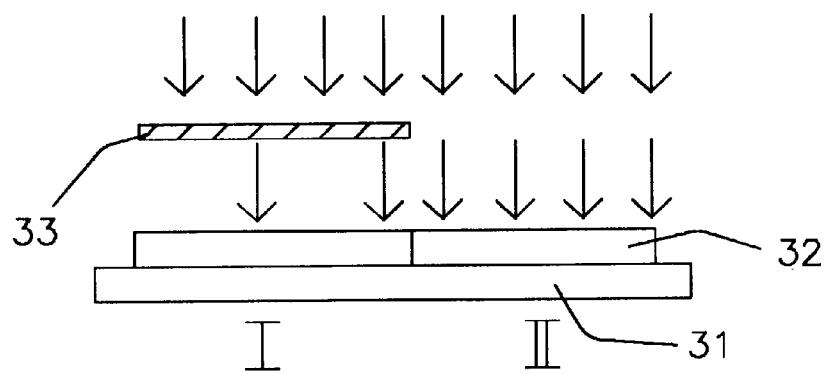
FIGS. 3A–3D are views showing the fabrication method of a two-domain LCD cell.

FIGS. 3A–3D are views showing the first embodiment of the present invention using a mask having half-transparent mask section for fabricating liquid crystal call, specifically a DDTN liquid crystal cell. That is, the half-transparent mask 33 covers the first domain I of the alignment layer 32 on a substrate 31 to block it during exposure process, as shown in FIG. 3A. As a result, the first domain I absorbs only a part of the irradiated light, while the second domain II, which is not covered by a mask, absorbs the total irradiated light, such as, for example, ultraviolet light. This means that the first and second domains absorb different amounts of ultraviolet energy. The side of the pretilt angle depends upon the ultraviolet energy absorbed by the alignment layer, as shown in FIG. 2. With this exposure, the degenerated directions are formed in the first and second domains I and II.

Figure 3B:
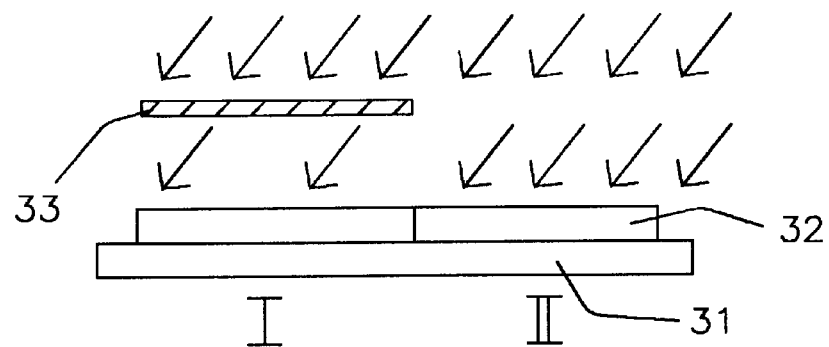
Figure 3C:
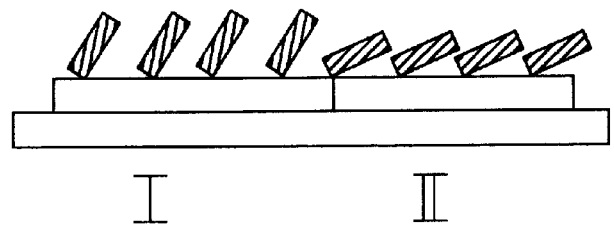
Figure 3D:
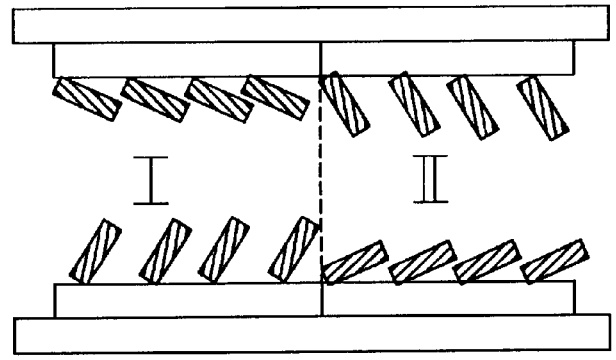

Subsequently, when the alignment layer 32 is obliquely exposed to the ultraviolet light, a degenerated direction is selected, as shown in FIG. 3B. Thus, parallel alignment directions having different pretilt angles are formed in the first and second domains, as shown in FIG. 3C. FIG. 3D is a view showing the DDTN liquid crystal cell with the upper and lower substrates fabricated by the above photo-alignment process attached together.

In the structure of FIG. 3D, the alignment directions of each domain are parallel, but the pretilt angle is different for each domain. Accordingly, the domain having a large pretilt angle is facing the domain having a small pretilt angle, so that the viewing angle directions compensate each other for each domain and the two substrates.

FIGS. 4A–4F are views showing the second embodiment of the present invention. In this embodiment, the liquid crystal cell is a four-domain liquid crystal cell. In this figure, the angled line portion, the cross-hatched portion, and the clear portion indicate the half-transparent mask section 33b, the opaque mask section 33c, and transparent mask section 33a of the mask 33 respectively.

Figure 4A:
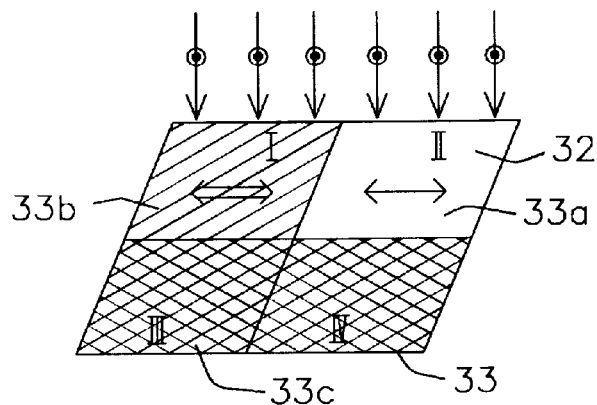
FIGS. 4A–4F are views showing the fabrication method of a four-domain LCD cell.
Figure 4B:
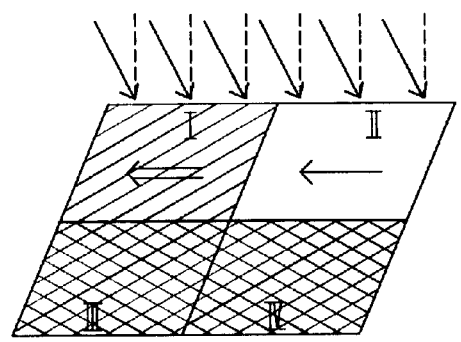
Figure 4C:
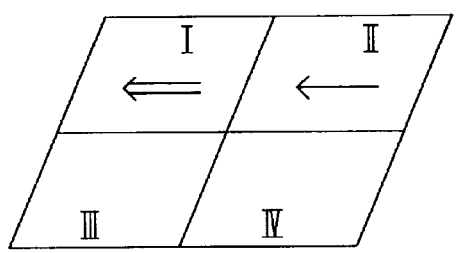
Figure 4D:
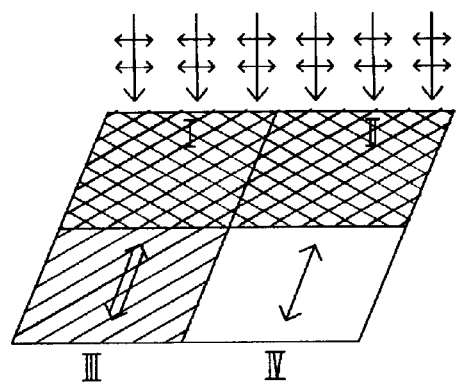

First, the substrate is covered by the mask 33. The first domain is covered by the half-transparent mask section 33b of the mask, the second domain II is covered by the transparent mask section 33a, the third and fourth domains III and IV are covered by the opaque mask section 33c, as shown in FIG. 4A. The transmittance of the half-transparent mask section 33b is about 30–80%. Subsequently, the substrate is vertically exposed to polarized light, such as ultraviolet light having a first polarization direction, in order to define the first degenerated alignment direction. As shown in FIG. 4B, the substrate is again exposed to oblique polarized light having a second polarization direction perpendicular to the first polarization direction, in order to define the first degenerated direction, which is approximately parallel to the exposure direction of the light. For this exposure, non-polarized light may be used. FIG. 4C shows the alignment direction of the first and second domains after the first exposure process. In the first and second domains, the alignment directions perpendicular to the first polarization direction are formed. However, since the third and fourth domains are covered by the opaque mask section 33c, no alignment direction is formed. The alignment directions of the first and second domain are parallel to each other, but the pretilt angles are different because of the difference in the absorption energy. In other words, the pretilt angle of the second domain is smaller than the pretilt angle of the first domain.

Figure 4E:
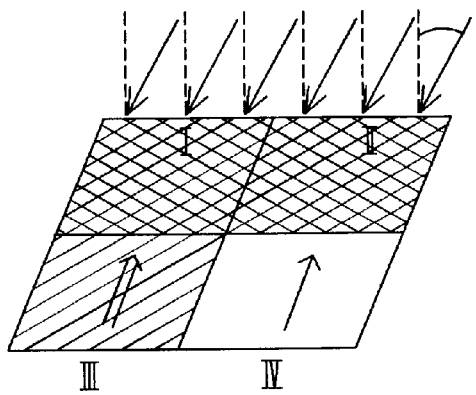

Thereafter, the first and second domains I and II, in which the alignment directions are already formed, are blocked with the opaque mask section 33c of the mask 33, the third and fourth domains III and IV are respectively covered by the half-transparent and transparent mask sections 33b and 33a. When the substrate is vertically exposed to polarized light having a third polarization direction parallel to the first polarization direction of the first exposure process, the second degenerated alignment directions perpendicular to the polarization direction are determined. Subsequently, the substrate is obliquely exposed to the polarized light having a fourth polarization direction in order to select one direction of the second degenerated directions, which is parallel to the exposure direction of the light. By the above second exposure process, the alignment directions are formed in the third and fourth domains III and IV, as shown in FIG. 4E. Like the alignment directions of the first and second domains I and II, the alignment directions of the third and fourth domains III and IV are parallel to each other but the pretilt angles are different. That is, the pretilt angle of the fourth domain IV is smaller than the pretilt angle of the third domain III because of difference of the UV energy absorbed by each domain.

Figure 4F:
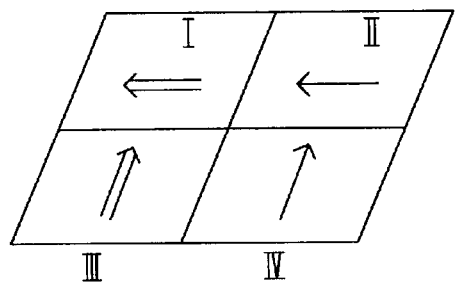

FIG. 4F is a view showing the 4-domain liquid crystal cell of the present invention. As shown in this figure, the alignment directions of the first and second domains I and II having different pretilt angles are parallel to each other, and the directions of the third and fourth directions III and IV having different pretilt angles are also parallel to each other. Further, the alignment directions of the first and second domains I and II are perpendicular to the alignment directions of the third and fourth domains III and IV.

These alignment direction-determined substrates are then used as the upper and lower substrates, so that a 4-domain liquid crystal cell is assembled.

In the above process, the DDTN liquid crystal cell is fabricated with four exposure processes and two masking processes. Further, the 4-domain liquid crystal cell is fabricated with eight exposure processes and four masking processes. Thus, the wide viewing angle liquid crystal cell can be fabricated using a simplified process and at a lower cost.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method of fabricating a multi-domain liquid crystal cell comprising the steps of:
    providing a substrate coated with a photo-alignment material;
    providing a mask comprising at least three regions having at least three different light transmittances above the substrate;
    exposing the substrate to a first ultraviolet light in a normal direction to the substrate, wherein different domains of the substrate absorb different amounts of light energy; and
    exposing the substrate to a second ultraviolet light at an oblique angle.

2. The method of claim 1, wherein said photo-alignment material comprises a polysiloxane-based material.

3. The method of claim 1, wherein the first ultraviolet light comprises a polarized light and the second ultraviolet light comprises an unpolarized light.

4. The method of claim 1, wherein the first ultraviolet light comprises an unpolarized light and the second ultraviolet light comprises a polarized light.

5. The method of claim 1, wherein the mask comprises at least one transparent region, at least one half-transparent region, and at least one opaque region.

6. A method of fabricating a multi-domain liquid crystal cell comprising the steps of:
    providing a first substrate coated with a photo-alignment material;
    covering the first substrate with a mask comprising a plurality of regions having different light transmittances, the mask comprising at least one transparent region, at least one half-transparent region, and at a least one opaque region;
    exposing the first substrate to a first ultraviolet light in a normal direction to the first substrate;
    exposing the first substrate to a second ultraviolet light at an oblique angle;
    covering the first substrate with the mask, wherein domains of the first substrate covered with the transparent region of the mask are corresponding to the half-transparent and opaque regions of the mask;
    exposing the first substrate to the first ultraviolet light in a normal direction to the first substrate;
    exposing the first substrate to the second ultraviolet light at an oblique angle;
    providing a second substrate coated with a photoalignment material;
    assembling the first substrate and the second substrate such that the first substrate and the second substrate are substantially parallel to each other; and
    injecting liquid crystal between the first and second substrates.

7. A method of fabricating a multi-domain liquid crystal cell comprising the steps of:
    coating a substrate with a photo-alignment material;
    covering the substrate with a mask, the mask comprising a plurality of transparent regions, a plurality of half-transparent regions, and a plurality of opaque regions, the regions corresponding to a plurality of domains on the substrate;
    exposing the substrate to a light polarized in a first polarization direction in a normal direction to the substrate so as to define alignment directions of domains of the substrate corresponding to the plurality of transparent regions and the plurality of half-transparent regions;
    exposing the substrate to a light at an oblique angle so as to select one alignment direction of the alignment directions;
    covering the substrate with another mask, such that the domains of the substrate having one alignment direction already selected are covered by opaque regions of the another mask, and remaining domains of the substrate not having an alignment direction are covered with either transparent regions of the another mask or half-transparent regions of the another mask;
    exposing the substrate to a light polarized in a second polarization direction in a normal direction to the substrate so as to define different alignment directions of the remaining domains; and
    exposing the substrate to a light at an oblique angle so as to select one alignment direction of the different alignment directions.

8. The method of claim 7, wherein said first polarization direction is different from said second polarization direction.

9. The method of claim 7, wherein the first polarization direction is perpendicular to the second polarization direction.

10. The method of claim 7, wherein the photo-alignment material comprises polysiloxane-based materials.

11. The method of claim 7, wherein the light comprises ultraviolet light.

* * * * *